United States Patent [19]

Kelley

[11] 4,439,950
[45] Apr. 3, 1984

[54] INTEGRAL PLANT CONTAINER AND COVER

[76] Inventor: Albert W. Kelley, Rt. No. 1, Box 28, Creamridge, N.J. 08514

[21] Appl. No.: 323,914

[22] Filed: Nov. 23, 1981

Related U.S. Application Data

[63] Continuation-in-part of Ser. No. 216,192, Dec. 15, 1980, Pat. No. 4,155,198, which is a continuation of Ser. No. 128,821, Mar. 10, 1980, abandoned.

[51] Int. Cl.³ ............................................. A01G 9/02
[52] U.S. Cl. ......................................... 47/85; 206/423
[58] Field of Search .................. 47/32, 73, 74, 76, 77, 47/84, 85; 206/423; 229/55, 32, 43, 34 HW

[56] References Cited

U.S. PATENT DOCUMENTS

| 900,123 | 10/1906 | Reed | 229/32 |
|---|---|---|---|
| 1,954,006 | 4/1934 | Wolf | 206/423 |
| 2,137,855 | 11/1938 | Otwell | 47/84 |
| 3,961,443 | 6/1976 | Insalaco | 47/32 |
| 4,069,917 | 1/1978 | Stollberg et al. | 47/84 X |
| 4,155,198 | 5/1979 | Kelley | 229/32 X |
| 4,268,992 | 5/1981 | Scharf | 47/32 X |

FOREIGN PATENT DOCUMENTS

| 180034 | 3/1954 | Austria | 229/34 HW |
|---|---|---|---|
| 891078 | 3/1962 | United Kingdom | 47/84 |

*Primary Examiner*—James R. Feyrer
*Attorney, Agent, or Firm*—Robert K. Youtie

[57] ABSTRACT

A plant container adapted to be fabricated from an integral blank of plastic sheet material and comprising a bottom wall, a peripheral side wall upstanding about the bottom wall, and a cover of a plurality of flaps extending laterally inwardly from the side wall with opposed flaps terminating short of each other to define therebetween a central passageway for the stem of a plant, the flaps being spaced below the top of the side wall to effectively limit the quantity of falling water received in the container by causing excess to overflow.

9 Claims, 4 Drawing Figures

INTEGRAL PLANT CONTAINER AND COVER

CROSS-REFERENCES TO RELATED APPLICATIONS

This application is a continuation-in-part application of my copending patent application Ser. No. 216,192 filed Dec. 15, 1980 now U.S. Pat. No. 4,155,198, which is a continuation of Ser. No. 128,821 filed Mar. 10, 1980 now abandoned.

BACKGROUND OF THE INVENTION

The invention of this application is generally concerned with containers for horticultural materials, generally of the type disclosed in said parent application Ser. No. 216,192, and also disclosed in my prior U.S. Pat. No. 4,155,198 and U.S. patent application Ser. No. 128,821 filed Mar. 10, 1980, now abandoned. In such containers the construction is of stiff, flexible sheet material, such as plastic, and in larger sizes may require reinforcement or stiffening to prevent or limit flexure or bellying of the container walls. Also, there exists the need for substantial drainage openings to prevent root soaking, which makes frequent watering necessary. Toward overcoming this problem, the instant invention provides a dished top or cover for receiving a limited quantity of water and slowly dispensing the water to the container. Applicant is aware of the below listed prior patents concerning plant containers with covers:

| PATENTEE | U.S. PAT. NO. |
|---|---|
| Lane | 757,045 |
| Flannigan | 3,475,858 |
| Van Zijverden | 3,631,627 |
| Emery | 3,755,965 |
| Caldwell | 3,896,586 |
| Insalaco | 3,961,443 |

SUMMARY OF THE INVENTION

It is an important object of the present invention to provide a plant container of the type described including a depressed or dished cover which aides in resisting bellying of the container, collects a predetermined amount of water for slow metering to the container contents, and which is adapted for quick, easy and economical manufacture and use.

It is a further object of the present invention to provide a plant container of the type described wherein the bottom and side walls, and dished cover are all integrally fabricated from a single sheet of stiff flexible material, such as plastic, for economy, durability and reliability throughout a long useful life.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

DESCRIPTION OF THE PREFERRED EMBODIMENT

Figure 1:
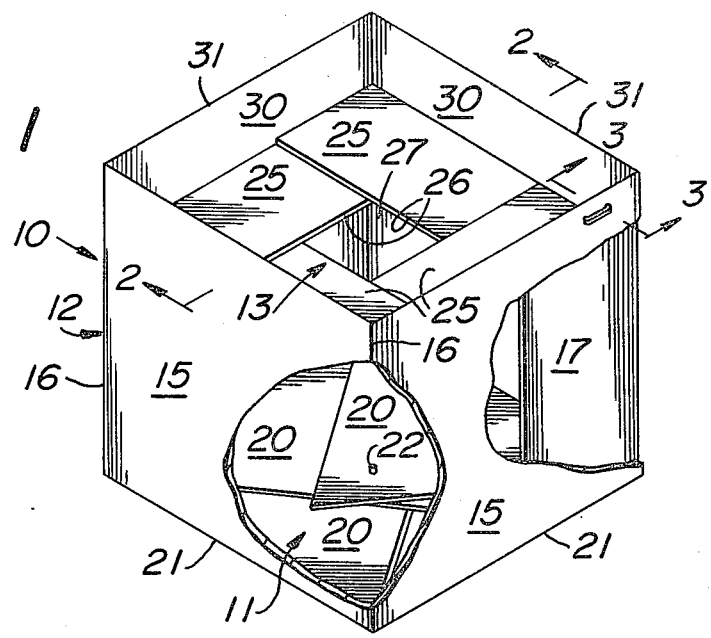
FIG. 1 is a top perspective view showing a plant container constructed in accordance with the teachings of the present invention, and partly broken away to illustrate interior construction.

Referring now more particularly to the drawings, and specifically to FIG. 1 thereof, a container is there generally designated 10, and may be of generally polygonal configuration, substantially cubical in the illustrated embodiment. The container 10 may include a generally square, essentially horizontal bottom wall 11, and an upstanding, circumferential side wall 12 extending peripherally about the bottom wall. In addition, extending over an upper region of the space bounded within the bottom wall 11 and side wall 12 is a top wall cover 13.

Figure 2:
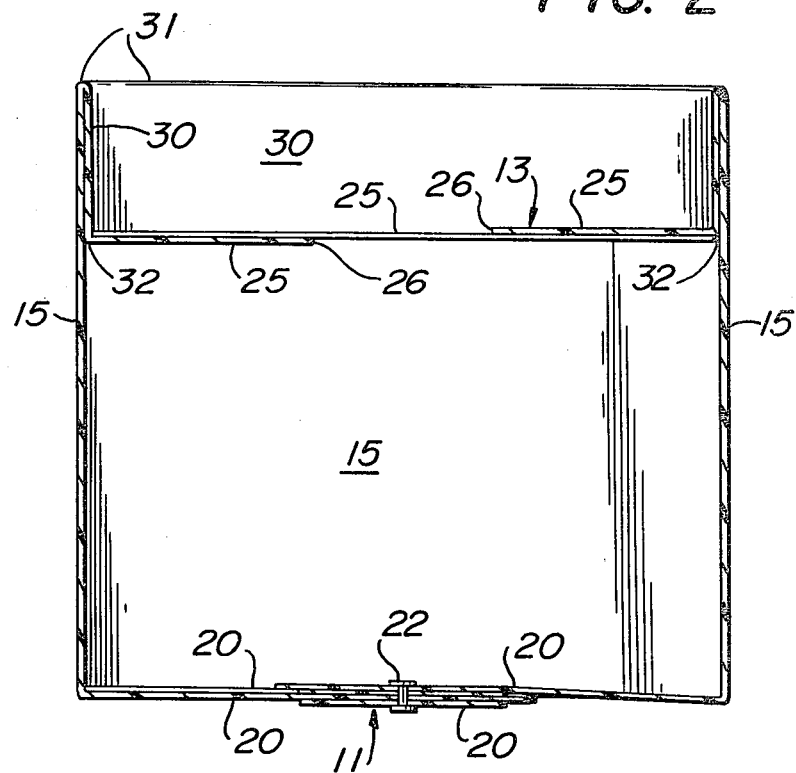
FIG. 2 is a sectional elevational view taken generally along the line 2—2 of FIG. 1.

As best seen in FIGS. 1 and 2, the peripheral side wall may be constituted of a plurality of generally rectangular or square upstanding panels 15 hingedly connected together along their vertical meeting edges by folds or creases 16. A securement panel 17 overlaps the next adjacent side wall panel 15 and is secured thereto, as by a fastener 19 to maintain the side walls in an upstanding, rectangular formation.

The bottom wall 11 is generally flat, and constituted of a plurality of preferably tapering extensions or flaps 20, each of which extends laterally inwardly from a lower edge fold or crease 21 of a respective side wall panel 15. The bottom wall panels 20 may taper inwardly and have their inner ends in overlapping relation and secured together by suitable securing means, such as a rivet 22.

The top wall or cover 13 includes a plurality of flaps or extensions 25 each extending laterally inwardly from a respective side wall panel 15, the cover flaps or extensions 25 being generally coplanar with each other at an elevation adjacent to and spaced below the upper extremity or edge of the side wall 12. The cover flaps 25 are each laterally coextensive with respective side wall panel 15, and extends generally horizontally inwardly therefrom to terminate in inner edges 26. Further, the inner terminal edges 26 of opposed cover flaps 25 are located adjacent to but spaced from each other to leave therebetween a central through opening or passageway 27. In the illustrated embodiment the side wall panels 15 are generally square, being four in number, and the cover flaps 25 are generally rectangular, being four in number corresponding to the side wall panels, the inner flap edges 26 of opposed flaps terminating short of each other to define the central through passageway 27. As the flaps 25 are laterally coextensive with their respectively adjacent side wall panels 15, the end portions of adjacent flaps are in overlapping relation, as best seen in FIGS. 1 and 2. This overlapping relation enables the flaps to aide in retaining each other in generally horizontal position, while permitting of flexure to swing the flaps upwardly and outwardly, as will appear presently in greater detail.

Considering FIG. 2, it will there be seen that an inner wall 30 is hingedly connected, as at 31 by a fold or crease to the upper edge of each side wall panel 15, and depends in facing engagement with the inner surface of the side wall panel to the level of the top wall or cover 13. The inner walls 30 are each laterally coextensive with their respective hingedly connected side wall panel 15, and are further hingedly connected at their lower edges, as by a fold or crease 32 to their respective cover flap 25.

Figure 3:
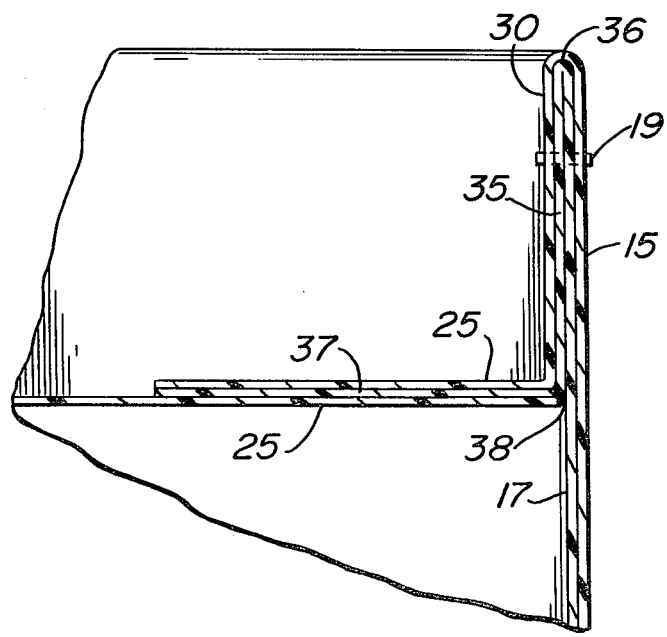
FIG. 3 is a partial sectional view taken along the line 3—3 of FIG. 1.

The securement flap or panel 17 may be seen in FIG. 3, where it is shown that an inner securement wall or panel 35 may be hingedly connected, as by a fold or crease 36 to the upper edge of the securement flap 17, and a cover securement panel or flap 37 may be hingedly connected, as by a fold or crease 38 to the lower edge of the inner securement panel 35. Thus, as seen in FIG. 3 the inner securement panel or wall 35 may depend in facing engagement with the securement flap 17, both of which are sandwiched between the adjacent outer wall panel 15 and inner wall panel 30. The securement cover flap 35 may extend in sandwiched relation between the overlapping edge portions of adjacent flaps 25. The fastener or staple 19, with the reinforcement afforded by the securement flap 17 and its inner securement wall 25, may serve to effectively retain the container side wall 12 in proper polygonal configuration. This single fastener 19, plus the bottom wall fastener 22 which serves to close the bottom wall have been found all that are necessary to insure proper staunchness and rigidity in the erected or setup condition. However, if additional fastener means are found necessary, they may be employed, where desired. Of course, the overlapping relationship of bottom wall extensions 20 affords therebetween adequate drainage to prevent root soaking.

Figure 4:
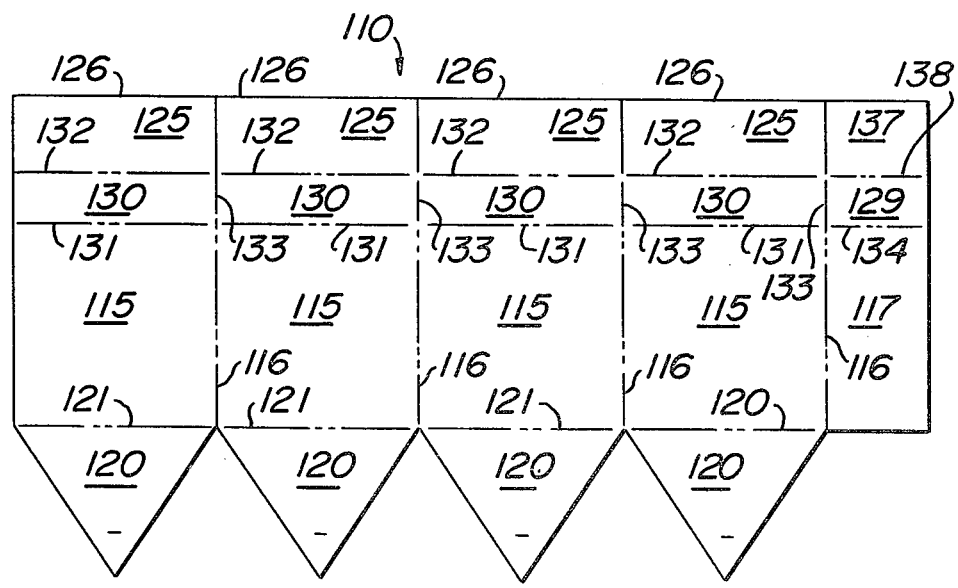
FIG. 4 is a plan view showing a one-piece blank adapted to be formed into the container of the present invention.

In FIG. 4 is shown a blank 110, which may be cut and scored from a single piece of flexible, stiff resilient sheeting, say of plastic or the like. The blank 110 may include a plurality of generally rectangular side wall panels 115, which may be square as in the illustrated embodiment, or of other suitable configuration, and arranged in side-by-side adjacent relation with contiguous panels hingedly connected together by a plurality of generally parallel folds or creases 116. Extending from one endmost side wall panel 115, the rightward panel 115 as seen in FIG. 4, and vertically coextensive therewith, is a generally rectangular securement panel 117.

A plurality of tapering bottom wall panels or triangular extensions 120 each extend from the lower end of a respective side wall panel 115, being hingedly connected thereto, as by a fold or crease 121. The tapering bottom wall extensions, or triangular panels 120 may each be laterally coextensive with its adjacent side wall panel 115, and taper to an apex away from the adjacent side wall panel.

At the upper edge of each side wall panel 115 is a generally horizontal fold or crease 131, to which is connected a generally rectangular inner wall panel 130. Each inner wall panel 130 is laterally coextensive with its contiguous side wall panel 115 and extends away from the latter a predetermined distance to a fold line or crease 132 which is parallel to the side wall panel fold line or crease 131. The inner wall panels 130 are substantially congruent in configuration, so that the fold lines 132 are in alignment with each other. Further, the adjacent inner wall panels 130 are hingedly connected together, as by fold lines 133, which are each aligned with a respective fold line 116.

Extending from the upper edge of securement panel 117, and hingedly secured thereto by an upper edge fold or crease 134 is an inner securement panel 129 generally laterally coextensive with its adjacent securement flap 117 and hingedly connected to the adjacent inner wall panel 130 by a fold line or crease 133 parallel to the hereinbefore described folds or creases 133.

Extending outwardly from each inner wall panel 130, laterally coextensive with, and hingedly connected thereto by the fold line or crease 132 is a generally rectangular top wall panel or flap 125. The top wall panels or flaps 125 may be generally congruent, each terminating in an outer edge 126, which outer edges are in alignment with each other and generally parallel to the fold lines 132, 131 and 121. In addition, a securement flap 137 is laterally coextensive with the inner securement wall 129, and hingedly connected thereto by a fold line or crease 138 in substantial alignment with the fold lines or creases 132.

In setting up the container 10 from the blank 110, it is believed readily understandable that the several lower end extensions or bottom wall panels 120 may be swung generally normal to their respective side wall panels 115, and the inner walls panels 130 and inner securement wall 129 may be swung into facing engagement with their respective adjacent side wall panels 115 and securement panel 117. The cover flap panels 125 and securement flap panel 137 may then be swung to outstand generally normal to the plane of side wall panels 115 and overlying inner wall panels 130 and 129. From this condition, the several side wall panels 115 may be swung relatively to each other about their hinged connection 116 to the assembled condition of FIGS. 1–3, and the securement members 19 and 22 applied, as desired.

It will now be appreciated that the top wall or cover 13 is depressed or recessed into the upper end of the receptacle or container 10, and in conjunction with its circumferential inner wall 30 defines a receiver for water which may slowly drain through the central passageway 27 and between the overlying flaps 25 to a contained plant. In addition, the double strength afforded by the facing engagement of inner walls 30 and outer wall panels 15 effectively resists distortion or bellying of the container even under substantial weight of a contained plant and growing medium.

It will also be apparent that a plant and its root ball may be readily removed from and replaced in a container 10, as for transplanting to a larger container, by outward swinging movement of the top wall flaps 25 toward their respective adjacent inner wall panels 30 to open the upper end of the container almost to the maximum internal dimensions of the container. Of course, the cover flaps 25 may be returned to their inwardly projecting condition of FIGS. 1–3 for continued growing and watering.

It will now therefore be appreciated that the device of the present invention provides a plant container, including a recessed cover and an integral blank therefore, which are extremely simple to manufacture and erect, highly economical, durable and reliable throughout a long useful life, and which otherwise fully accomplish their intended objects.

Although the present invention has been described in some detail by way of illustration and example for purposes of clarity of understanding, it is understood that certain changes and modifications may be made within the spirit of the invention.

What is claimed is:

1. A plant container fabricated of waterproof plastic sheet material and using no adhesive, said container comprising a generally rectangular bottom wall, a side wall of four rectangular outer walls upstanding equally from and peripherally about said bottom wall and combining therewith to contain plant growing medium, a rectangular inner wall depending from the upper extremity of each outer wall on the inner side thereof to a predetermined elevation and a flap extending laterally inwardly from the lower edge of each inner wall with opposed flaps terminating in free edges proximate to and spaced from each other to define a central passageway between said flap edges for the stem of a plant with its roots in the growing medium, said flaps being generally coplanar with each other spaced over said bottom wall and each having its opposite ends respectively under and over adjacent flaps to define an upper wall spaced a predetermined distance below the top of said side wall for receiving water to a depth of said distance with flow of excess water over said side wall to prevent overwatering.

2. A plant container according to claim 1, said flaps being resiliently deflectable outwardly to pass a plant root ball for transplanting.

3. A plant container according to claim 1, said bottom wall, side wall, inner walls and flaps being integrally fabricated from a single blank of stiff resilient sheet material.

4. A plant container according to claim 3, said blank comprising a plurality of side-by-side side wall panels hingedly connected by fold lines for swinging movement into polygonal configuration, a securing panel on an outermost side wall panel for securement to the distal side wall panel in the polygonal configuration, a plurality of bottom wall extensions hingedly connected on the lower edges of respective side wall panels and swingable into generally planar overlying relation to define the bottom wall, a plurality of inner wall panels hingedly connected on the upper edges of respective side wall panels for inward swinging movement into facing relation with respective side wall panels, and a plurality of cover panels hingedly connected to the distal edges of respective inner wall panels and swingable normal thereto to define said inwardly extending flaps.

5. A plant container according to claim 1, said bottom wall being generally polygonal, said side wall comprising a plurality of side wall panels, each upstanding from a respective side of said polygonal bottom wall, and said cover flaps each extending from a respective side wall panel.

6. A plant container according to claim 5, said cover flaps each being laterally coextensive with its adjacent side wall panel and in overlapping relation with the adjacent pair of cover flaps.

7. A plant container according to claim 1, said outer side walls being integrally connected together along three pairs of meeting edges, a securing panel on one edge of the remaining pair of meeting edges and overlapping adjacent outer wall portion of the other edge of said remaining pair of meeting edges, and a single metal fastener extending through and securing together said securing panel and adjacent outer wall portion in said overlapping relation.

8. A plant container according to claim 1, said bottom wall comprising a bottom panel tapering inwardly from the lower edge of each outer wall and in overlying relation with each other and providing therebetween openings for gravitationally passing water not absorbed by the growing medium.

9. A plant container according to claim 8, in combination with a single metal fastener extending through all of said bottom panels.

* * * * *